United States Patent Office 2,800,483
Patented July 23, 1957

2,800,483
ACID AMIDE-LIKE TROPANE DERIVATIVES

Ernst Jucker, Neu-Allschwil, and Anton Ebnöther, Basel, Switzerland, assignors, by mesne assignments, to Saul & Co., Newark, N. J., as nominee of Fidelity Union Trust Company No Drawing. Application October 17, 1955, Serial No. 541,044

Claims priority, application Switzerland October 20, 1954

6 Claims. (Cl. 260—292)

The present invention relates to pharmaceutically valuable acid amide-like tropane derivatives. More specifically the invention relates to acid amide-like derivatives of the tropane series which correspond to the formula $$\left[\begin{array}{c} R_1-CH-CH-CH_2 \\ | \quad | \quad | \\ N-CH_3 \; HC-NH-R_2 \\ | \quad | \quad | \\ CH_2-CH-CH_2 \end{array}\right]_n \quad (I)$$

wherein $n$ is the integer 1 or the integer 2, $R_1$ stands for H or O-alkyl, $R_2$ stands for

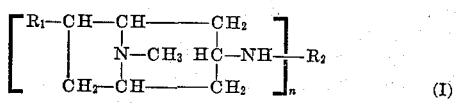

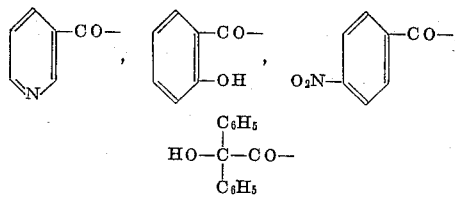

alkyl-O-CO- or (alkyl)$_2$N-CO- when $n=1$, and for

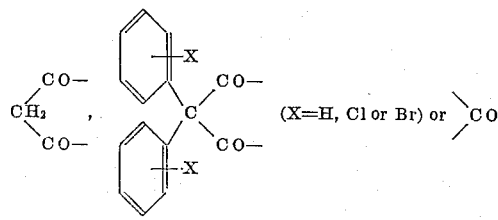

when $n=2$.

The new compounds of the foregoing Formula I can be prepared, briefly stated, by reducing a tropinone-oxime of the formula

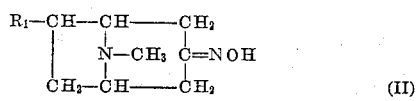

wherein $R_1$ has the afore-recited significance, whereby the corresponding 3-amino-tropane derivative is produced, and reacting the so-obtained primary amine with a derivative of an organic mono-basic or di-basic acid of the general formula $R_2(Y)_n$, wherein $R_2$ and $n$ have the above-recited significances, and Y stands for Cl or for $N_3$, the radical of hydrazoic acid.

The process can, briefly stated, be carried out for example by reducing the tropinone-oxime catalytically or with sodium in an aliphatic alcohol to produce the corresponding 3-amino-tropane derivative, and then reacting the latter with an acid chloride or an acid azide in an inert solvent in the cold, at ordinary temperature or at raised temperature, in the presence or absence in the reaction medium of a hydrogen halide-binding agent, for example a tertiary organic base. The reaction product is isolated from the reaction mixture, for example by filtering off or by evaporating the reaction solution and extracting the residue with a suitable solvent. Purification is effected by recrystallization, if necessary, after fractionation under reduced pressure; in some cases, it may be advantageous to convert the crude product into a salt of an appropriate acid and to recrystallize such salt. The acid amide-like tropane derivatives of the present invention as thus obtained are, at ordinary temperature, solid crystalline bases which form stable salts with acids. They are characterized by therapeutically valuable pharmacodynamic properties, since they have a nicotinolytic action and exert a regularizing, especially an anti-fibrillatory action on the rhythm of the heart function. They are characterized by low toxicity and by a great therapeutic breadth. They are useful in therapy for combatting heart rhythm disturbances, for example paroxysmal tachycardia, and are also useful prophylactically for preventing the appearance of such disturbances. The compounds can be administered parenterally or per os, preferably per os in individual doses of about 5 to 10 milligrams.

The following examples set forth presently-preferred representative exemplary embodiments of the invention, wherein the parts and percentages are by weight (unless otherwise indicated) and the temperatures are expressed in degrees centigrade. Parts by weight bear the same relation to parts by volume as do grams to milliliters.

Example 1

10 parts of tropinone-oxime, dissolved in 100 parts by volume of ethanol and 8 parts by volume of glacial acetic acid are hydrogenated under a pressure of 60 atmospheres at room temperature (about 20–30°) in the presence of Raney nickel for 18 hours. The catalyst is then filtered off, the solution evaporated, the residue dissolved in 20 parts by volume of water, and 15 parts of potassium hydroxide added while cooling. The resultant alkaline solution is exhaustively extracted with ether, and the residue from the evaporated ethereal extract distilled under a pressure of 12 mm. Hg. The fraction which passes over at 88–97° is 3-amino-tropane, which contains 20–30% of 3-amino-pseudo-tropane. The product can be used without further purification.

6.9 parts of benzilic acid hydrazide are dissolved in dilute hydrochloric acid and, while cooling and shaking vigorously, an aqueous solution of 2.3 parts of sodium nitrite is added dropwise. The oily azide which precipitates is washed with ice water and is dried in ethereal solution over sodium sulfate. 4 parts of the above-prepared mixture of 3-amino-tropane and 3-amino-pseudo-tropane are added dropwise while cooling, to the ethereal solution of the azide, and the resultant mixture is allowed to stand for 18 hours at 0°. The solution is then evaporated under reduced pressure and the residue is taken up in chloroform and shaken with aqueous sodium carbonate solution. The chloroform layer is dried over potassium carbonate, then evaporated under reduced pressure and the residue dissolved in methanol. Upon the addition of ether, benzilic acid-tropyl-3-amide crystallizes out and after several recrystallizations is obtained in the form of rodlets which melt at 201–202°.

The hydrochloride of the benzilic acid-tropyl-3-amide is prepared with the aid of methanolic HCl. It is obtained in the form of rodlike prisms which decompose at 225–230° after two recrystallizations from ethanol-ether.

Example 2

7.5 parts of nicotinic acid-hydrazide-di-hydrochloride are dissolved in 20 parts by volume of water, at 0° and while stirring vigorously, a solution of 5 parts of sodium nitrite in 10 parts by volume of water is added dropwise. The solution is rendered alkaline with potassium carbonate and extracted three times with ether and twice with ethyl acetate. The ether and ethyl acetate extracts are combined and dried over potassium carbonate, 5 parts of 3-amino-tropane (crude product containing 20–30% of 3-amino-pseudo-tropane, prepared according to Example 1) are added dropwise while cooling, and the mixture is allowed to stand for 20 hours at room temperature. The solution is evaporated under reduced pressure and the residue is taken up in chloroform and shaken out with aqueous sodium carbonate solution. The chloroform layer is dried over potassium carbonate, evaporated under reduced pressure, the residue dissolved in acetone, and ether added slowly. Upon standing for a long time, nicotinic acid-tropyl-3-amide crystallizes out, and after recrystallization from acetone is obtained in the form of strongly hygroscopic crystals. Distillation of this product at 170–180° under a pressure of 0.02 mm. Hg yields a distillate which immediately solidifies in the form of prisms which melt at 122–123°.

In order to prepare the hydrochloride, the amide is dissolved in a small quantity of methanol, methanolic HCl is added until the reaction is acid to Congo red, and ether is added whereupon nicotinic acid-tropyl-3-amide-di-hydrochloride crystallizes out, which, after recrystallization from methanol-ether, is obtained as hygroscopic rodlets. After being dried at 110° in a high vacuum, these rodlets have a melting point of 230–250° (decomposition).

*Example 3*

7.1 parts of salicylic acid hydrazide are dissolved in 21 parts by volume of 2-normal hydrochloric acid and while cooling and stirring vigorously, a solution of 3.5 parts of sodium nitrite in 5 parts by volume of water is added dropwise. The azide which precipitates is filtered off with suction, washed with ice water, and dried in ethyl acetate solution over sodium sulfate. To the solution of the azide in ethyl acetate there are added dropwise 6.5 parts of 3-amino-tropane (crude product, containing 20–30% of 3-amino-pseudo-tropane, prepared according to Example 1), the mixture is allowed to stand for 20 hours at 4°, and the precipitated oil separated by decantation. The oil is dissolved in methanol after which methanolic HCl is added until a reaction which is acid to Congo red is achieved. After the addition of ether, salicylic acid-tropyl-3-amide-hydrochloride crystallizes out. The residue from the evaporation of the ethyl acetate solution yields with methanolic HCl another fraction of the same hydrochloride. The combined hydrochlorides are dissolved in the 5-fold quantity of saturated aqueous sodium bicarbonate solution. In a short time salicylic acid-tropyl-3-amide crystallizes out and, after recrystallization from methanol-acetone and from ethanol, melts at 188–189°.

From the so-obtained free base there is obtained, with the aid of methanolic HCl, the hydrochloride in the form of long needles which, after recrystallization from methanol-ether, melt at 245–251°.

*Example 4*

5 parts by volume of chloroformic acid ethyl ester are added dropwise, while cooling with ice and stirring vigorously, to a solution of 5 parts of 3-amino-tropane (crude product, containing 20–30% of 3-amino-pseudo-tropane, prepared according to Example 1) and 5 parts by volume of triethylamine in 30 parts by volume of benzene. After the mixture had been allowed to stand for 15 hours at room temperature, a small quantity of saturated aqueous potassium carbonate solution is added in order to bring the hydrochloride into solution, the benzene layer is separated, and the aqueous layer is shaken out three times with chloroform. The combined benzene and chloroform extracts are dried over sodium sulfate and evaporated and the yellow oily residue distilled under a pressure of 12 mm. Hg. The slightly yellow-colored oil, which goes over at 140–170°, is converted with the aid of methanolic HCl into the hydrochloride which is then freed of adhering oily substances by boiling with acetone. After one recrystallization from ethanol-ether and two recrystallizations from ethanol-acetone, tropyl-3-urethane hydrochloride (hydrochloride of N-tropyl-3-carbaminic acid-ethyl ester) is obtained in the form of hygroscopic needles which melt at 211–214°.

*Example 5*

12 parts by volume of a solution of 20% strength of phosgene in benzene is added dropwise at 50° in the course of two hours and while stirring, to a solution of 6 parts of 3-amino-tropane (crude product, containing 20–30% of 3-amino-pseudo-tropane, prepared according to Example 1) in 25 parts by volume of benzene, and the mixture allowed to stand for 12 hours at room temperature. The precipitate which separates out is filtered off, dissolved in a small quantity of water, and the solution saturated with potassium carbonate and extracted several times with chloroform. The chloroform solution, after being dried over potassium carbonate, leaves behind on evaporation a brown oily residue which is dissolved in acetone. After standing for a long time, di-tropyl-3-urea crystallizes out, which after purification by fractional crystallization from methanol-ether melts at 220–230°.

From the so-obtained free base, di-tropyl-3-urea-di-hydrochloride is obtained with the aid of methanolic HCl; after two recrystallizations it has a melting point of above 300°.

*Example 6*

A solution of 2.5 parts of nicotinic acid chloride in 10 parts by volume of benzene is added dropwise, while cooling with ice and stirring vigorously, to a solution of 2.2 parts of 3-amino-pseudo-tropane [R. Willstätter and W. Müller, Berichte 31, 1202 (1898)] in 10 parts by volume of benzene. There is immediately formed a colorless precipitate, which slowly turns red. The mixture is allowed to stand at room temperature for 20 hours. The hygroscopic precipitate is then filtered off with suction, dissolved in water, and the solution saturated with sodium bicarbonate and extracted with chloroform. The chloroform solution, after being dried over sodium sulfate, leaves behind on evaporation under reduced pressure, as a residue, nicotinic acid-pseudo-tropyl-3-amide which, after recrystallization from methanol-ether, is obtained in the form of needles which melt at 195–196°.

Nicotinic acid-pseudo-tropyl-3-amide-di-hydrochloride is prepared from the so-obtained free base with the aid of methanolic hydrochloric acid and crystallizes in anhydrous form from methanol-ether. It is hygroscopic and changes into a monohydrate.

*Example 7*

(a) A solution of 4 parts of 3-amino-pseudo-tropane in 20 parts of benzene is added dropwise, at 0° and while stirring vigorously, to a solution of 5 parts of salicylic acid chloride in 20 parts by volume of benzene, and the mixture is stirred first for two hours at room temperature and then for two more hours at 80°. A yellow oily precipitate immediately separates out, which gradually becomes colorless and upon heating becomes granular. It is dissolved in a small quantity of water and the solution is saturated with sodium bicarbonate, whereupon colorless needles separate out; since these can be recrystallized only from water and only with substantial losses, they are converted into the hydrochloride with the aid of methanolic HCl. The hydrochloride crystallizes out of methanol-ether in the form of needles which decompose at 258–264°.

(b) 5 parts of salicylic acid hydrazide are dissolved in 15 parts by volume of 2-normal hydrochloric acid and, while cooling and shaking vigorously, a solution of 2.8 parts of sodium nitrite in a small quantity of water is added dropwise. The azide which separates out is filtered off with suction, washed with ice water, and dried in ethyl acetate solution for a short time over sodium sulphate. 4.5 parts of 3-amino-pseudo-tropane are added dropwise to the solution of the azide in ethyl acetate. There is forthwith a precipitation of a yellow oil which in a short time begins to crystallize. The mixture is allowed to stand for two days at 0°, the precipitated product is recrystallized from ethanol and then dissolved in methanol, after which by the addition of ethereal HCl, the hydrochloride of salicylic acid-pseudo-tropyl-3-amide is prepared; after recrystallization from ethanol-ether, this hydrochloride melts at 255–264° with decomposition.

Example 8

3 parts of benzilic acid hydrazide are slurried in 6 parts by volume of water, a sufficient quantity of 2-normal hydrochloric acid is added so that a clear solution is obtained, and then at 0° and while shaking vigorously a solution of 1 part of sodium nitrite in 3 parts by volume of water is added dropwise. The azide which precipitates in oily state is washed with ice water and dried in ether solution over sodium sulfate. 1.87 parts of 3-amino-pseudo-tropane are added dropwise, while cooling, to the ethereal solution of the azide. An oily precipitate separates out which, upon standing for a long time, becomes crystalline. It is allowed to stand over night at room temperature, after which the precipitate is filtered off with suction and dissolved in chloroform, and the chloroform solution shaken out with 2-normal aqueous sodium carbonate solution. The chloroform solution after being dried over sodium sulfate, leaves behind on evaporation a residue which, upon recrystallization from methanol-ether, yields benzilic acid-pseudo-tropyl-3-amide in the form of cubes which melt at 210–211°.

The hydrochloride of the so-obtained base crystallizes from methanol in the form of needles with a melting point at 250–252°.

Example 9

A solution of 2.2 parts of malonyl chloride in 15 parts by volume of benzene is added dropwise while cooling with ice and stirring vigorously, to a solution of 4 parts of 3-amino-pseudo-tropane in 25 parts by volume of benzene, the mixture stirred for one hour at room temperature and three hours at 60°, and the precipitate which separates filtered off. It is dissolved in a small quantity of water and the resultant aqueous solution saturated with potassium carbonate and extracted with chloroform. The chloroform solution, after being dried over sodium sulfate, leaves behind on evaporation a residue which, after extraction with acetone, is recrystallized from chloroform-ether. Two recrystallizations from methanol-ether yield analytically pure malonic acid-di-pseudo-tropyl-3-amide which decomposes at 258–264°.

The so-obtained free base yields with methanolic HCl the corresponding di-hydrochloride, which is recrystallized from methanol-acetone and pure methanol. The di-hydrochloride decomposes above 250° and is strongly hygroscopic.

Example 10

2.5 parts by volume of chloroformic acid ethyl ester are added dropwise, while cooling with ice and stirring vigorously, to a solution of 2.8 parts of 3-amino-pseudo-tropane and 2.8 parts by volume of triethylamine in 15 parts by volume of benzene. After the mixture has been allowed to stand for 24 hours at room temperature, it is warmed for a short time on the water bath and the colorless precipitate which forms is filtered off. The filtrate leaves behind upon evaporation a slowly crystallizing oil which, after being distilled at 150–160° under a pressure of 12 mm. Hg and being twice recrystallized from hexane, yields N-pseudo-tropyl-3-urethane (N-pseudo-tropyl-3-carbaminic acid-ethyl ester) in the form of long needles which melt at 93–94°.

The so-obtained free base forms a hydrochloride which crystallizes from methanol-ether in the form of prisms which melt at 240–241°.

Example 11

10 parts by volume of a solution of 20% strength of phosgene in benzene is added dropwise at 50° and while stirring, to a solution of 5 parts of 3-amino-pseudo-tropane in 20 parts by volume of benzene; after two hours 5 more parts by volume of the phosgene solution are added and stirring is continued for two more hours. The colorless precipitate which forms is filtered off, dissolved in a small quantity of water and the obtained solution saturated with potassium carbonate. The resultant product which was already partly separated in crystalline form is taken up in chloroform and the resultant solution is dried over potassium carbonate and evaporated.

The obtained residue is recrystallized from acetone and then from methylene chloride-ether, and finally acetone. The so-obtained di-pseudo-propyl-3-urea melts, with decomposition, at 200–210°.

From the thus-produced base, there is prepared with the aid of methanolic HCl the di-pseudo-tropyl-urea-di-hydrochloride which, after being twice recrystallized from methanol-ether, has a melting point above 330°.

Example 12

A solution of 3 parts of 3-amino-pseudo-tropane in 20 parts by volume of benzene is added, while stirring and cooling, to a solution of 2.5 parts of dimethyl-carbamyl chloride and 3 parts by volume of triethyl-amine in 20 parts by volume of benzene, and the mixture stirred for one more hour at room temperature and three hours at 80°. The colorless precipitate is filtered off hot, the filtrate is evaporated, and the residue is distilled under a pressure of 0.03 mm. Hg. The fraction which distills at 130–140° is recrystallized from methylene chloride-ether. It melts at 142–145°. The precipitate, which is insoluble in benzene, is extracted with ethanol, the obtained extract is evaporated under reduced pressure, and the residue is dissolved in water, and the aqueous solution rendered alkaline with aqueous caustic soda and then extracted with chloroform. The chloroform solution is dried over sodium sulfate and evaporated, and the obtained residue yields, after recrystallization from methylene chloride-ether a product which melts at 140–144°. Both fractions are combined and yields, after recrystallization from methylene-chloride-ether, pseudo-tropyl-3-dimethyl-urea in the form of quadratic platelets which melt at 145–146°. The so-obtained base yields with methanolic HCl the pseudo-tropyl-dimethyl-urea-hydrochloride which, after two recrystallizations from chloroform-acetone, melts at about 100° with liberation of 1 mol of water of crystallization, followed by re-solidification. The substance, after being dried at 75° in a high vacuum, melts with decomposition at 224°. In the air, it quickly takes on 1 mol of water of crystallization.

Example 13

193 parts of hydroxylamine-hydrochloride in 672 parts by volume of water are added, with cooling, to a solution of 300 parts of 6-ethoxy-tropinone-hydrochloride [Stoll, Jucker and Lindenmann, Helv. 37, 495 (1954)] and 918 parts of potassium hydroxide in 1680 parts by volume of water. After being allowed to stand for three days at room temperature a vigorous stream of carbon dioxide is blown into the mixture, while cooling, until it is rendered bicarbonate-alkaline. The oil which precipitates is dissolved in chloroform and the chloroform solution is dried over magnesium sulfate and evaporated under reduced pressure. The viscous pale brown residue is dissolved in a small quantity of ethanol and, to the resultant solution, there is added ethanolic HCl while cooling with ice until a reaction which is acid to Congo red is achieved, whereupon after the addition of a small quantity of ether 6-ethoxy-tropinone-oxime-hydrochloride crystallizes out which, after recrystallization from the 4-fold quantity of ethanol, has a melting point of 190–191°. The free oxime is a pale yellow viscous oil.

36 parts of sodium in the form of small pieces are added gradually at 140° to a solution of 25 parts of 6-ethoxy-tropinone-oxime in 250 parts by volume of amyl alcohol. When the hydrogen evolution slows down, 250 additional parts by volume of amyl alcohol are added. After three hours all the sodium is dissolved, whereupon the reaction mixture is cooled, 500 parts by volume of water added and enough concentrated hydrochloric acid to obtain an acid reaction of Congo red. The aqueous phase is separated, and the amyl alcohol shaken out twice, each time with 50 parts by volume of 2-normal hydrochloric acid. The aqueous extract is evaporated, and the residue is dissolved in a small quantity of water, to which solid potassium hydroxide is added until a strong alkaline reaction is achieved, after which the oil which precipitates is distilled with steam. The distillate is neutralized with hydrochloric acid, evaporated under reduced pressure, and the solution of the residue in a small quantity of water is supersaturated with potassium hydroxide. It is then extracted with ether, the ethereal extract dried over potassium hydroxide and evaporated, and the obtained residue fractionated at a pressure of 12 mm. Hg. The principal fraction which goes over between 115° and 135° is again distilled whereupon 6-ethoxy-3-amino-pseudo-tropane distills over at 124–128° under a pressure of 12 mm. Hg.

The dihydrochloride of this base crystallizes from alcohol-acetone in the form of strongly hygroscopic needles, which immediately deliquesce in the air. Upon rubbing, the oily dihydrochloride again crystallizes as the hydrate.

A solution of 4 parts of 6-ethoxy-3-amino-pseudo-tropane in 20 parts by volume of benzene is added dropwise at 0° to a solution of 5 parts of nicotinic acid chloride in 20 parts by volume of absolute benzene. In a short time, an oil separates out, which gradually solidifies. After standing for 20 hours at room temperature, the precipitate is suction-filtered, it is dissolved in a small quantity of water made alkaline with potassium carbonate and shaken out three times with chloroform. The resultant solution, dried over sodium sulfate, leaves behind on evaporation a residue which is fractionated in a high vacuum. The fraction which passes over at 170–180° under a pressure of 0.05 mm. Hg, is a colorless oil, which yields upon crystallization from moist ether 6-ethoxy-pseudo-tropyl-3-nicotinic acid-amide-dihydrate in the form of prisms which, after two recrystallizations from acetone-ether, melt at about 80° with liberation of water.

In order to prepare the monohydrochloride, the calculated quantity of methanolic hydrochloric acid is added to the base and the mixture evaporated. The residue is recrystallized from acetone and twice from ethanol-ether and yields 6-ethoxy-pseudo-tropyl-3-nicotinic acid-amide-hydrochloride in the form of rodlets which decompose at 228–231°.

Example 14

3 parts of salicylic acid hydrazide are dissolved in 10 parts by volume of 2-normal hydrochloric acid and, while cooling and stirring vigorously, a solution of 1.4 parts of sodium nitrite in 3 parts by volume of water is added dropwise. The azide which separates out is filtered off with suction, washed with ice water and dried in ethyl acetate solution over sodium sulfate. 3.6 parts of 6-ethoxy-3-amino-pseudo-tropane (prepared as in Example 13) are added dropwise, while cooling, to the solution of the azide in ethyl acetate. An oil separates out in a short time. The mixture is allowed to stand for 20 hours at room temperature, is then shaken out with a small quantity of saturated aqueous sodium bicarbonate solution, after which the ethyl acetate layer is dried over sodium sulfate and is evaporated. The residue is distilled in a high vacuum. The fraction which passes over at 150–190° under a pressure of 0.02 mm. Hg is converted, with the aid of methanolic HCl, into the hydrochloride, which crystallizes out of acetone-ether in the form of hygroscopic needles which are joined together in cluster form. After being exposed to the moist atmosphere, the 6-ethoxy-pseudo-tropyl-3-salicylic acid-amide-hydrochloride crystallizes out of acetone-ether in the form of hydrate which melts at 105–108° with liberation of water.

Example 15

5 parts of benzilic acid hydrazide are suspended in 6 parts by volume of water, enough 2-normal hydrochloric acid is added so that a clear solution is obtained, and then at 0° and while shaking vigorously, a solution of 1.5 parts of sodium nitrite in 3 parts by volume of water is added dropwise. The oily azide which separates out is washed with ice water and is dried in ethyl acetate solution over sodium sulfate. 3.8 parts of 6-ethoxy-3-amino-pseudo-tropane (prepared as in Example 13) are added dropwise, while cooling, to the solution of the azide in ethyl acetate, the mixture allowed to stand at 4° for 20 hours, and the ethyl acetate decanted from the separated oil. After evaporation under reduced pressure, there remains behind a residue which is shaken out in chloroform solution with saturated aqueous potassium carbonate solution. The chloroform solution dried over sodium sulfate, leaves behind on evaporation a crystalline residue which is first boiled with ether and then recrystallized from acetone-ether. Two recrystallizations from acetone-ether yield 6-ethoxy-pseudo-tropyl-3-benzilic acid-amide in the form of flat rectangular plates which melt at 164–166°.

In order to prepare the hydrochloride, the free base is dissolved in methanol, and methanolic HCl is added to the solution until it has an acid reaction to Congo red. The solution is evaporated to dryness, and the residue crystallized from acetone-ether. By recrystallization from methanol-ether, the hydrochloride is obtained in the form of fine needles which melt at 214–216°.

Example 16

2.5 parts by volume of chloroformic acid ethyl ester are added dropwise at 0° and while stirring to a solution of 3.7 parts of 6-ethoxy-3-amino-pseudo-tropane and 2.5 parts by volume of triethylamine, the mixture allowed to stand for 20 hours at room temperature and then shaken out with a small quantity of saturated aqueous potassium carbonate solution. The potassium carbonate solution is then extracted two more times with chloroform. The combined organic extracts are dried over sodium sulfate and evaporated. From the residue, N-(6-ethoxy-pseudo-tropyl-3)-urethane (6-ethoxy-pseudo-tropyl-3-carbaminic acid-ethyl-ester) distills at 175–195° under a pressure of 12 mm. Hg in the form of a colorless viscous oil which, after standing for a long time, crystallizes in the form of needles and, after recrystallization from hexane, melt at 73–74°. With methanolic HCl, the free base yields the hydrochloride which, after being thrice recrystallized from acetone, is obtained in the form of quadratic, flat hygroscopic platelets.

Example 17

A solution of 1 part of hydroxylamine-hydrochloride in 2 parts by volume of water is added to a solution of 2.5 parts of potassium hydroxide and 1.18 parts of 6-methoxy-tropinone-hydrochloride (Stoll, Jucker and Lindenmann, Helv. 37, 495 [1954]) in 5 parts by volume of water and the mixture allowed to stand at room temperature for 48 hours. Carbon dioxide is then introduced, and the solution, saturated with potassium carbonate is extracted with a total of 80 parts by volume of chloroform. The combined chloroform extracts, dried over sodium sulfate, on evaporation leave behind an oily residue which is caused to crystallize in the form of the hydrochloride. The 6-methoxy-tropinone-oxime-hydrochloride, after recrystallization from methanol-ether, has a melting point of 216–218°.

60 parts of sodium in the form of small pieces are slowly introduced at 140° into a solution of 33 parts of 6-methoxy-tropinone-oxime in 400 parts by volume of amyl alcohol. When the hydrogen evolution subsides, 400 additional parts by volume of amyl alcohol are added. After 3 hours all the sodium has dissolved, whereupon the solution is cooled, 500 parts by volume of water added and sufficient concentrated hydrochloric acid to render the solution acid to Congo red. The aqueous phase is separated, and the amyl alcohol again shaken out twice, each time with 100 parts by volume of 2-normal hydrochloric acid. The aqueous acid extracts are evaporated and the residue is dissolved in a small quantity of water, after which solid potassium hydroxide is added until a strongly alkaline reaction is obtained, whereupon the oil which separates out is distilled with steam. The distillate is neutralized with hydrochloric acid, evaporated under reduced pressure, and the solution of the residue in a small quantity of water supersaturated with potassium hydroxide. It is then extracted with ether, the ether extract dried over potassium hydroxide and evaporated, and the residue fractionated at 12 mm. Hg. At 117–122°, 6-methoxy-3-amino-pseudo-tropane distills as a colorless oil.

The dihydrochloride crystallizes from ethanol-ether in the form of needles which immediately deliquesce in the air.

For purposes of characterization, the N-(6-methoxy-$\psi$-tropyl-3)-N'-phenyl-thiourea can be prepared with the aid of phenyl isothiocyanate. It crystallizes from ethyl acetate in the form of needles which melt at 183°.

A solution of 1.4 parts of malonyl dichloride in 10 parts by volume of absolute chloroform is added dropwise at room temperature and while stirring vigorously to a solution of 3.4 parts of 6-methoxy-3-amino-psuedo-tropane, 3 parts by volume of triethylamine added slowly after three hours and the solution allowed to stand for three more hours, while being stirred. The solution is then shaken out with aqueous potassium carbonate solution, dried over sodium sulfate and evaporated. From the solution of the yellow residue in ether, there separates in a short time malonic acid-bis-(6-methoxy-psuedo-tropyl-3-amide) which, after two recrystallizations, has a melting point of 195–201°.

*Example 18*

A solution of 15 parts of 6-methoxy-tropinone-oxime hydrochloride (prepared according to the first paragraph of Example 17) in 100 parts by volume of methanol is shaken for 15 hours with hydrogen at room temperature and under a pressure of 50 atmospheres in the presence of Raney nickel. The catalyst is then filtered from the solution, methanolic HCl is added until a reaction acid to Congo red is achieved, after which the solution is evaporated. The residue is boiled with absolute ethanol, whereupon 6-methoxy-3-amino-tropane - dihydrochloride separates as a colorless powder. After two recrystallizations from methanol acetate, it decomposes at about 260°. The mother liquors contain the very strongly hygroscopic 6-methoxy-3-amino-psuedo-tropane-dihydrochloride.

Potassium hydroxide is added to the solution of 6-methoxy-3-amino-tropane-dihydrochloride in a small quantity of water, after which the solution is exhaustively extracted with ether. The ether extract is dried over potassium hydroxide and is evaporated, after which the residue is distilled under a pressure of 12 mm. Hg, whereupon 6-methoxy-3-amino-tropane goes over at 114–115° as a colorless oil.

A solution of 0.7 part by volume of benzoyl chloride in 5 parts by volume of absolute chloroform is added dropwise, slowly and while stirring, into a solution of 1 part of 6-methoxy-3-amino-tropane in 10 parts by volume of absolute chloroform, the mixture heating up slightly. 0.85 par by volume of triethylamine is then added and, while stirring, the reaction mixture is allowed to stand for four hours. The solution is shaken out with 2-normal aqueous sodium carbonate solution, dried over sodium sulfate and evaporated, whereupon the residue completely crystallizes. The obtained benzoic acid-6-methoxy-tropyl-3-amide crystallizes out of acetone-ether or ethyl acetate-ether in the form of needles which melt at 135–136°.

*Example 19*

A solution of 2.77 parts of diphenylmalonyl-dichloride in 10 parts by volume of chloroform is added dropwise, at room temperature and while stirring, to a solution of 2.77 parts of a mixture, prepared as described in Example 1, of 3-amino-tropane and 3-amino-pseudo-tropane in 20 parts by volume of chloroform, 2.7 parts by volume of triethylamine added at the end of four hours, and the mixture allowed to stand at room temperature for 12 hours while being stirred. The solution is then shaken out twice with aqueous potassium carbonate solution, dried over sodium sulfate, and evaporated. The residue is dissolved in hexane and chromatographed on a column of 120 parts of aluminum oxide. From the fractions washed out with benzene and chloroform, diphenylmalonyl-bis-(tropyl-3-amide) crystallizes from hexane in the form of fine rodlets which, after two recrystallizations from hexane and from ether, have a melting point of 136–138°.

*Example 20*

A solution of 2.5 parts of diphenylmalonyl-dichloride is added dropwise at room temperature and while stirring, to a solution of 2.45 parts of 3-amino-pseudo-tropane and 2.5 parts by volume of triethylamine in 20 parts by volume of absolute chloroform, and the mixture allowed to stand for 20 hours while stirring constantly. The solution, filtered from small quantities of precipitated 3-amino-pseudo-tropane-hydrochloride, is washed with saturated aqueous sodium carbonate solution, dried over sodium sulfate and evaporated. From a solution of the residue in hexane, diphenylmalonyl-bis-(pseudo-tropyl-3-amide) crystallizes, after standing for a long time, in the form of needles joined together as clusters which, after recrystallization from hexane-ether and pure ether, have a melting point of 136–137°.

*Example 21*

A solution of 2 parts of diphenylmalonyl-dichloride in 20 parts by volume of absolute chloroform is added dropwise, at room temperature and while stirring, to a solution of 2.4 parts of 6-methoxy-3-amino-tropane (prepared according to Example 18) in 20 parts by volume of absolute chloroform, 2 parts by volume of triethylamine added at the end of two hours and the mixture allowed to stand for 15 hours while being stirred. The solution is shaken out twice with saturated aqueous sodium carbonate solution, dried over sodium sulfate and evaporated. From the solution of the residue in ether, diphenylmalonyl-bis-(6-methoxy-tropyl - 3 - amide) crystallizes in the form of rectangular platelets which, after recrystallization from hexane and ether melt at 139–142°.

*Example 22*

A solution of 2 parts of diphenylmalonyl-dichloride in 20 parts by volume of absolute chloroform is added dropwise, at room temperature and while stirring, to a solution of 2.4 parts of 6-methoxy-3-amino-pseudo-tropane in 20 parts by volume of absolute chloroform, 2 parts by volume of triethylamine added at the end of two hours and the mixture allowed to stand, with stirring, for 15 hours. The solution is shaken out twice with saturated aqueous sodium carbonate solution, dried over sodium sulfate and evaporated. From the solution of the residue in hexane, diphenylmalonyl-bis - (6 - methoxy - pseudo-tropyl-3-amide) crystallizes out in the form of colorless needles which, after several recrystallizations from hexane or isopropyl ether, melt unsharply between 90° and 150°.

*Example 23*

A solution of 3.6 parts of p-nitrobenzoyl chloride in 20 parts by volume of chloroform are added dropwise to a solution of 2.7 parts of 6-methoxy-3-amino-tropane (prepared according to Example 18) in 20 parts by volume of chloroform, 2.4 parts by volume of triethylamine added, and the mixture allowed to stand at room temperature for three hours while being stirred. The chloroform layer is shaken out with aqueous sodium bicarbonate solution and evaporated. The residue yields, upon recrystallization from benzene, p-nitrobenzoic acid-6-methoxy-tropyl-3-amide in the form of a pale yellow powder which after further recrystallization, one from benezene in the presence of animal charcoal and three times from acetone, melts at 164–165°.

As is evident from the foregoing, from the bases of the present application, e. g. by reaction with acids suitable for the preparation of therapeutically useful salts, such as the hydrohalic acids, phosphoric acid, acetic acid, propionic acid, citric acid, methane-sulfonic acid, ethane-sulfonic acid, salicylic acid, tartaric acid, etc., the corresponding therapeutically useful salts are obtained, namely the hydrohalides, phosphate, acetate, propionate, citrate, methane-sulfonate, ethane-sulfonate, salicylate and tartrate, respectively, etc.

Having thus disclosed the invention what is claimed is:

1. A member selected from the group consisting of compounds of the formula $$\left[\begin{array}{c} R_1-CH-CH-\!-\!-\!-CH_2 \\ \phantom{R_1-CH-}N-CH_3\ HC-NH-\!-\!-R_2 \\ CH_2-CH-\!-\!-\!-CH_2 \end{array}\right]_n$$

and the salts thereof with acids, wherein $n$ is one of the integers 1 and 2, $R_1$ is a member selected from the group consisting of H and O-alkyl, and $R_2$ is a member selected from the group consisting of

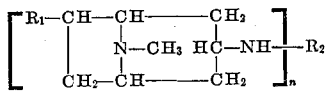

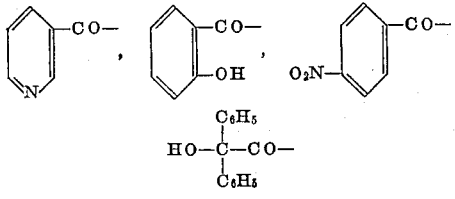

$C_6H_5CO-$, alkyl-O—CO— and $(alkyl)_2N$—CO— when $n=1$, and from the group consisting of

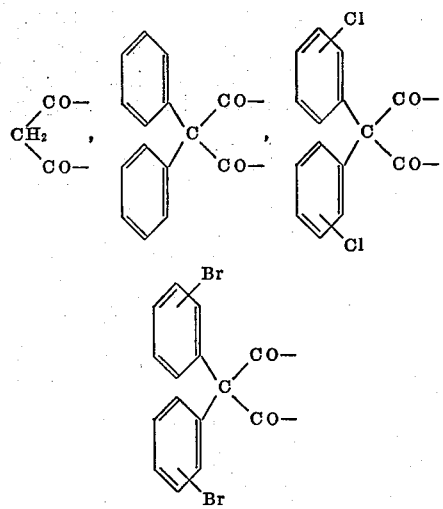

and $=CO$ when $n=2$, "alkyl" being lower alkyl throughout.

2. Salicylic acid-tropyl-3-amide.
3. Benzilic acid-pseudo-tropyl-3-amide.
4. Malonic acid-di-pseudo-tropyl-3-amide.
5. 6-ethoxy-pseudo-tropyl-3-salicylic acid-amide.
6. Diphenylmalonyl-bis - (6-methoxy-pseudo - tropyl-3-amide).

References Cited in the file of this patent
UNITED STATES PATENTS

| | | |
|---|---|---|
| 2,235,661 | Wolfes et al. | Mar. 18, 1941 |
| 2,678,317 | Payne et al. | May 11, 1954 |